(12) United States Patent
Reiser

(10) Patent No.: US 6,718,485 B1
(45) Date of Patent: Apr. 6, 2004

(54) SOFTWARE EMULATING HARDWARE FOR ANALYZING MEMORY REFERENCES OF A COMPUTER PROGRAM

(75) Inventor: John F. Reiser, Portland, OR (US)

(73) Assignee: Parasoft Corporation, Monrovia, CA (US)

( * ) Notice: Subject to any disclaimer, the term of this patent is extended or adjusted under 35 U.S.C. 154(b) by 520 days.

(21) Appl. No.: 09/713,704

(22) Filed: Nov. 15, 2000

Related U.S. Application Data
(60) Provisional application No. 60/165,840, filed on Nov. 16, 1999.

(51) Int. Cl.[7] .............................................. G06F 11/00
(52) U.S. Cl. .................. 714/38; 712/227; 712/244; 714/28; 714/30; 714/45; 714/47; 717/128; 717/141; 717/159
(58) Field of Search ......................... 712/227, 224; 714/28, 30, 38, 45, 47; 717/128, 141, 159

(56) References Cited

U.S. PATENT DOCUMENTS

| | | | | |
|---|---|---|---|---|
| 5,335,344 A | | 8/1994 | Hastings | ..................... 395/575 |
| 5,522,036 A | * | 5/1996 | Shapiro | ........................ 714/38 |
| 5,581,697 A | | 12/1996 | Gramlich et al. | ...... 395/183.11 |
| 5,838,948 A | | 11/1998 | Bunza | ........................ 395/500 |
| 5,872,909 A | * | 2/1999 | Wilner et al. | .................. 714/38 |
| 5,911,059 A | | 6/1999 | Profit, Jr. | ..................... 395/500 |
| 6,161,200 A | * | 12/2000 | Rees et al. | ..................... 714/38 |
| 6,195,748 B1 | * | 2/2001 | Chrysos et al. | ............. 712/227 |
| 6,311,327 B1 | * | 10/2001 | O'Brien et al. | ............. 717/114 |

* cited by examiner

*Primary Examiner*—Nadeem Iqbal
*Assistant Examiner*—Christopher Euripidou
(74) *Attorney, Agent, or Firm*—Christie, Parker & Hale, LLP

(57) ABSTRACT

The present invention is a software system that detects large classes of programming and run-time errors in a computer program by emulating the hardware platform and monitoring the execution of a program and the concurrent data manipulation. The software system locates bugs in binary object executable programs. Working on the binary object executable program at runtime, the tool verifies memory references and program implementation by monitoring each logical memory access for data.

26 Claims, 4 Drawing Sheets

SOFTWARE EMULATING HARDWARE FOR ANALYZING MEMORY REFERENCES OF A COMPUTER PROGRAM

CROSS-REFERENCE TO RELATED APPLICATION

This patent application claims the benefit of the filing date of U.S. Provisional Patent Application Ser. No. 60/165,840, filed Nov. 16, 1999 and entitled "SOFTWARE EMULATING HARDWARE FOR ANALYZING MEMORY REFERENCES", the entire contents of which are hereby expressly incorporated by reference.

FIELD OF THE INVENTION

The present invention relates to a computer system and method for testing and debugging computer programs. More specifically, the present invention is directed to a method and system for emulating hardware for analyzing memory references.

BACKGROUND OF THE INVENTION

Reliable and successful software is built through sound, efficient and thorough testing. However, software testing is labor intensive and expensive and accounts for a substantial portion of commercial software development costs. At the same time, software testing is critical and necessary to achieving quality software. Typically, software testing includes test suite generation, test suite execution validation, and regression testing.

The size and sophistication of computer programs have substantially increased over time. As a result, the need for more flexible and sophisticated testing and debugging tools has also increased. Memory access related errors are one of the most important errors which must be watched and corrected. The current practice for testing and debugging programs include having the compiler output extra instructions for debugging purposes or to post-process the object files. These approaches require pre-processing of the program which is cumbersome, requires larger storage, and is time consuming.

Therefore, what is needed is a test tool for assisting programmers in testing software programs that is capable of directly emulating the preexisting instructions and not inserting (storing) new instructions into (the storage occupied by) preexisting machine code.

SUMMARY OF THE INVENTION

The present invention is a software system that detects large classes of programming and run-time errors, including algorithmic anomalies, bugs, and deficiencies in a computer program. By emulating the hardware platform and monitoring the execution of a program and the concurrent data manipulation, the tool helps developers understand how their code behaves while requiring less test preparation time and less storage. The software system locates bugs in binary object executable programs. Working on the binary object executable program at runtime, the tool verifies memory references and program implementation by monitoring each logical memory access for data. The software tool works directly with any executable program, and does not require source or relocatable object code. This is an advantage when pieces of the program are provided by others, who may furnish only "shared libraries" or other forms which are not relocatable object code, and not source code.

In one embodiment, the software tool of the present invention is a software emulation of hardware that analyzes software by checking all data memory accesses made by an application process running on specific operating systems. When an improper behavior is detected by the tool, the tool issues an error message identifying the kind of error and where it occurred. Improper behavior may be any access to a logically unallocated region, errors or abuses of the dynamic memory allocation protocol, and the like.

In one aspect, the present invention describes a method for analyzing a computer program for execution on a target hardware platform. The method comprises the steps of emulating the target hardware platform by a computer software; fetching an instruction included in the computer program; decoding the fetched instruction; executing the decoded instruction; and monitoring data manipulation by the emulated hardware platform of the executed instruction.

Still other embodiments of the present invention will become readily apparent to those skilled in the art from the following detailed description. As will be realized, the invention is capable of other and different embodiments and its several details are capable of modification in various respects, all without departing from the spirit and scope of the present invention. Accordingly, the drawings and detailed description are to be regarded as illustrative in nature and not as restrictive.

DETAIL DESCRIPTION

The software tool of the present invention is a software emulation of hardware that analyzes software by checking data memory accesses made by an application process running on specific operating systems such as, Linux x86 or other operating systems. The tool emulates a hardware platform and monitors the execution of a program and the concurrent data manipulation by the hardware platform. The software tool emulates the hardware by maintaining the programmer-accessible hardware state as software variables, and by imitating the programmer-accessible effects of the hardware circuitry in program logic. In one embodiment, the variables include the instruction pointer (program counter), hardware processor registers, and hardware processor flags and condition codes.

The tool uses software logic to fetch, decode, and execute the current instruction, and to advance to the next instruction, following the documented or observed side effects of the hardware. Memory is maintained as memory; the emulator itself occupies address ranges that are not used by the program being emulated. In one embodiment, as many as possible of emulator's variables are maintained in the hardware to which they correspond.

When the tool detects improper behavior, the tool issues an error message identifying the kind of error and where it occurred. Improper behavior may be any access to a logically unallocated region, or a read (or modify) access to bytes which have been allocated but not yet written. Improper behavior also includes a read operation that fetches uninitialized bytes from memory with the resulting value being logically undefined. Another example of improper behavior is errors or abuses of the dynamic memory allocation protocol, such as attempting to free the same block twice.

Figure 1:
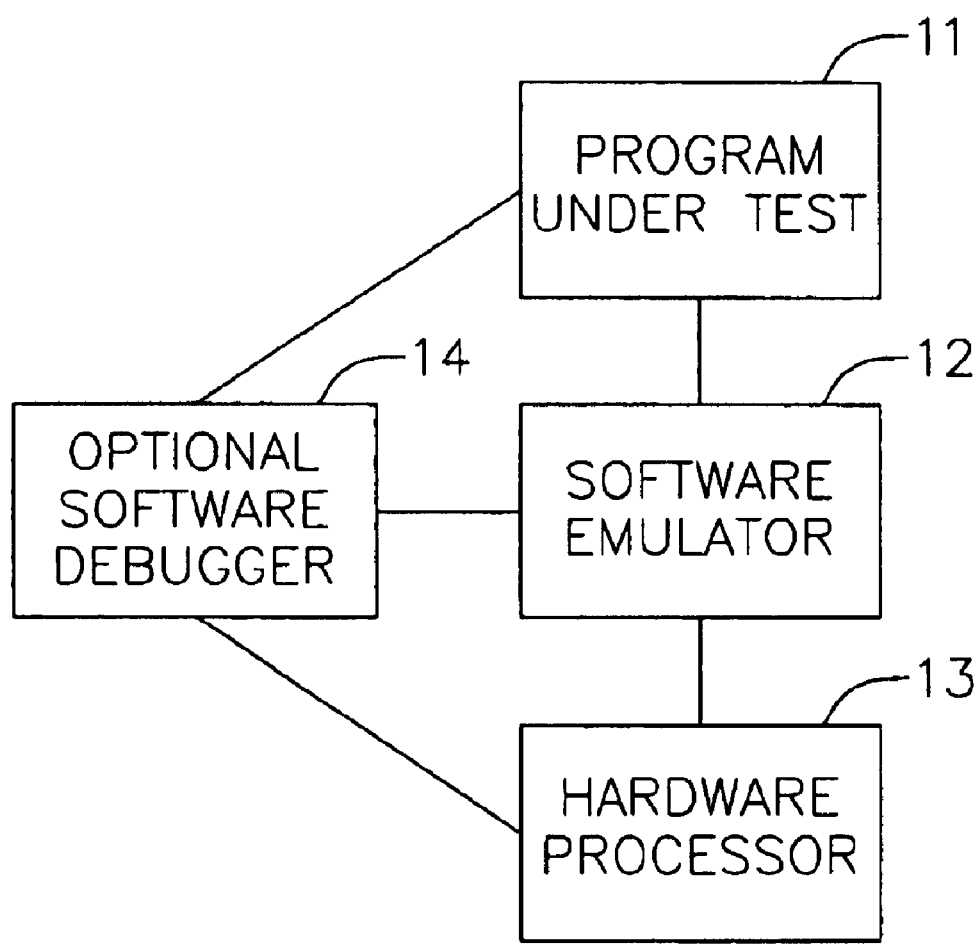
FIG. 1 is an exemplary block diagram for a program under test according to one embodiment of the present invention.

FIG. 1 is an exemplary block diagram of a test environment according to one embodiment of the present invention. A software emulator 12 is included between a program under test 11 and a hardware processor 13 to provide comprehensive, detailed diagnostic information about the execution of the program under test. An optional software debugger 14 may be used to facilitate interaction with the user.

The tool also detects memory blocks that have been allocated and not freed. Such a memory block is called "in use." If a memory block is in use, and is unreachable by starting from the stack or statically allocated regions and proceeding through already reached allocated blocks, the block is then called a "memory leak." The block could not be freed without some oracle to specify its address as the parameter to the deallocation routine. A memory leak is similar to a "garbage" block in a classical garbage collection scheme. At the termination of the application process, the tool reports memory leaks automatically, and reports non-leaked blocks in use if requested, for example, by a command line option.

The tool checks all data memory accesses, whether in the application developer's compiled code, language runtime support routines, archive or shared libraries, and modules loaded dynamically. The tool works with existing ELF executable files. Preferably, the tool requires no recompilation and no re-linking.

The present invention provides diagnosis of each code problem, including a description of the error, the executable location containing the error, stack trace information, and specific pointers to source code file and line if such information was saved when the code was compiled. The error reports help developers find errors more quickly. The invention operates without modifying source code. The software tool checks all data memory references made by a process, whether in the developer's compiled code, language support routines, shared or archive libraries, or operating system kernel calls. The tool detects and reports reads of uninitialized memory, reads or writes that are not within the bounds of allocated blocks, and allocation errors such as memory leaks. The tool works with existing executable programs. In most cases, the tool does not require recompilation or re-linking. Furthermore, no changes to environment variables are necessary. A call to the tool, such as the name of the tool, may be added to the beginning of a command line or other invocation of the application process. It will then execute the process and check all the data memory references.

Using this software tool does not require running under a debugger; however, the tool works with existing debuggers. The tool provides an interface to many existing debuggers to facilitate interaction with the user for debugging a program under test. The tool provides a programmable interface to its error reporting and system call monitoring. An application developer can intercept, reformat, and redirect the tool's error reports. Local modifications or additional Input/Output controls (IOCTLs) and other system calls can be handled easily.

The present invention detects a variety of error categories including:

Memory corruption/uninitialized memory

Memory leaks

Memory allocation errors

I/O errors

Pointer errors

The tool is also capable of performing accounting of memory states and accesses. The following table depicts an example for different states and the corresponding accesses.

| states (below); accesses (right) | Read or Modify | Write |
|---|---|---|
| Unallocated | error: Read before Allocate | error: Write before Allocate |
| Allocated but not Written | error: Read before Write | OK; becomes Allocated and Written |
| Allocated and Written | OK | OK |

Examples of Allocators include: malloc, calloc, realloc, memalign, __libc__malloc, __libc__calloc, __libc__realloc, __libc__memalign, stack growth (push, create frame), __brk, brk, __sbrk, sbrk, mmap, and the like.

Examples of De-allocators include: free, realloc, __libc__ free, __libc__realloc, __brk, brk, __sbrk, sbrk, stack trim (pop, delete frame), munmap, and the like.

Other known functions include: memcpy, memset, memmove, memchr, bcopy, bzero, strcat, strchr, __stpcpy, strcpy, strrchr. These functions are optimized for faster performance, and/or to reduce the clutter of multiple error messages that arise from a single call, and/or to suppress "false positive" Read before Write messages from instruction sequences that are known to be used to implement write-allocate cache control, or speculative word-wide reading of byte arrays.

Figure 2:
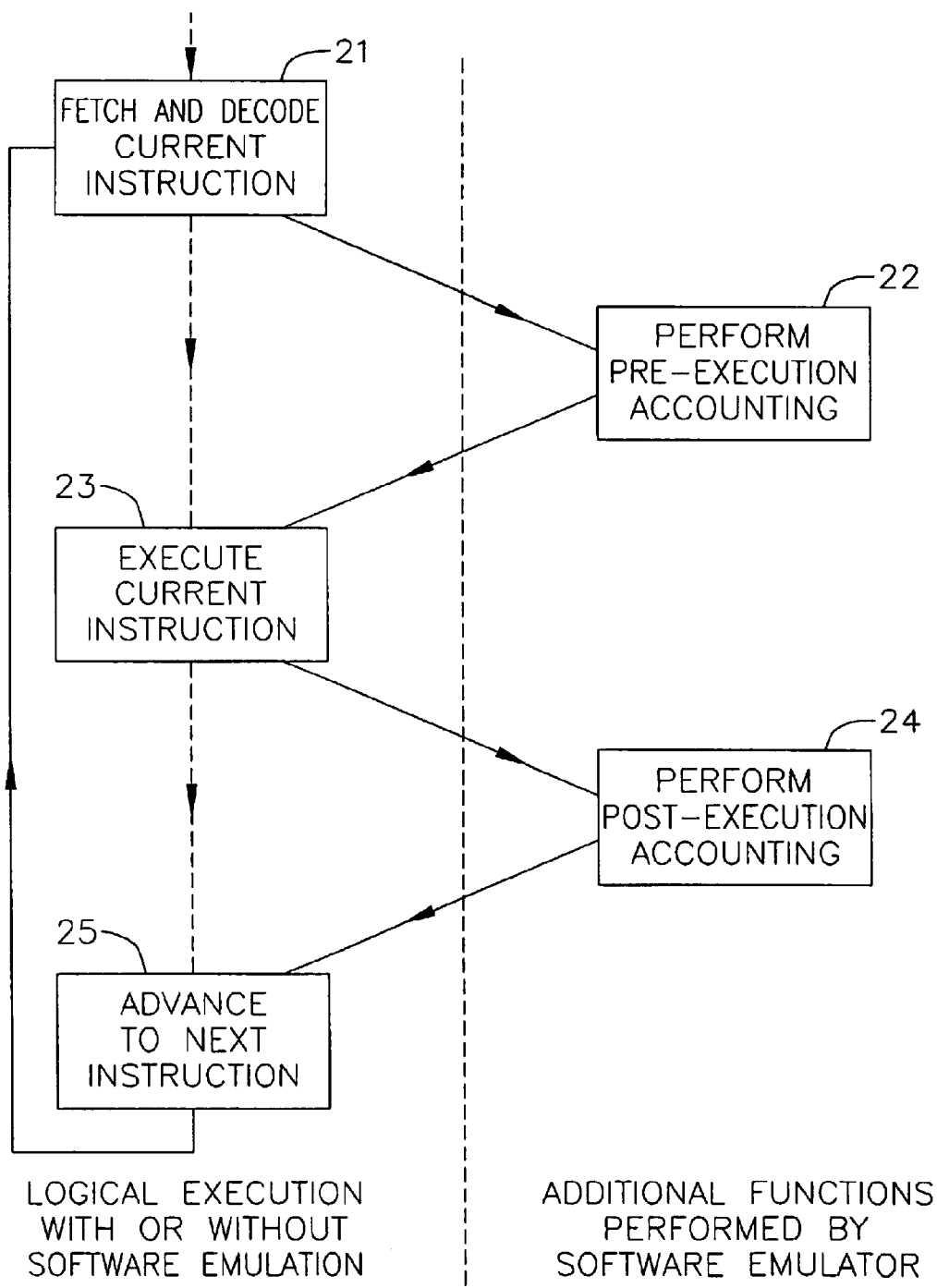
FIG. 2 is an exemplary flow process of instruction execution according to one embodiment of the present invention.

FIG. 2 is an exemplary flow process of instruction execution according to one embodiment of the present invention. The area ¢20 to the left side of FIG. 2 shows an instruction-by-instruction flow of execution through Fetch and Decode (block 21), Execute (block 23), and Advance (block 25). As shown in the area to the right side of FIG. 2, the software emulator performs two additional steps: Pre-Execution Accounting (block 22), and Post-Execution Accounting (block 24). For many instructions, the effects of Execution can be predicted in advance. Alternatively, the effects of Execution are not relevant to the accounting. Therefore, in one embodiment, all of the accounting (if any) can be performed in block 22, and not block 24. However, when the current instruction is a system call or it controls an external device, which for example transfers data of varying length, some or all of the accounting need to occur in block 24. As shown in FIG. 2, this accounting is performed after execution, when the extent of the effects of execution can be determined.

The tool is capable of finding problems related to memory corruption. Memory corruption is a substantially problematic error, especially if it is disguised. The following is an example which concatenates the arguments given on the command line and prints the resulting string.

```
 1: /* file: helio.c */
 2: #include <stdlib.h>
 3:
 4: int main(int argc, char *argv[])
 5: {
 6:     char *str = (char *)malloc(16);
 7:     int i;
 8:
 9:     str[0] = '\0';
10:     for (i=0; i<argc; ++i) {
11:         strcat(str, argv[i]);
12:         if (i < (argc −1)) strcat(str, "");
13:     }
14:     printf("You entered: %s\n", str);
15:     return 0;
16: }
```

When compiled with a typical compiler and run, the results are as expected, for example:

$ cc -g -o hello hello. c
$ ./hello world
You entered: ./hello world
$ ./hello cruel world
You entered: ./hello cruel world If this were the extent of the test procedures, a programmer would probably conclude that this program works correctly, despite the fact that it has a very serious memory corruption bug. If the programmer executes with the software tool of the present invention, the command tool ./hello cruel world, the tool reports an error because the string that is being concatenated becomes longer than the 16 characters allocated at line 6. Here the tool has found a bug automatically, with no additional effort, simply by emulating the program.

Write before Allocate: 4 bytes at 0x08049670; 4 bad bytes, first at 0x08049670
from 0x0000+strcat line 29
from 0x004a+main line 11from 0x00eb+_libc_start_main
line 78from 0x0021+.entryfrom 0x3988+sigprocmask line 61
  0 bytes beyond block of 16 bytes at 0x08049660 allocated 1 calls ago (serial 14)
from 0x000d+main line 6
from 0x00eb+_libc_start_main line 78
from 0x0021+.entry
from 0x3988+sigprocmask line 61

The tool also finds all problems related to overwriting memory or reading past the legal bounds of an object that is allocated dynamically (with malloc.)

The tool is also capable of detecting problems with pointer abuse. Problems with pointers are among the most difficult encountered by C and C++ programmers. The categories of pointer related problems detected by the tool include operations on NULL pointers, operations on uninitialized pointers, and operations on pointers that don't actually point to valid data at all.

A pointer is preferably a 32 bit quantity stored at an aligned 4 byte boundary. The application may modify the low order bits of a pointer (for example, to implement tags or "smart pointers") as long as the 32 bit result addresses the beginning or interior of the block. Any other manipulation, such as flags in hi-order bits, stem-and-leaf storage of pointer values, etc., results in a pointer to someplace else, possibly to a region that the tool considers to be unallocated. No portion of the stack is considered to be a memory leak. Pointers that reside in the stack are one set of "root" pointers that are examined during leak detection. Another set of root pointers is the collection of mmaped regions from executable files, shared libraries, or dynamically loaded modules.

The following example illustrates the code for a second version of the "hello" program that uses dynamic memory allocation. When a programmer compiles the program and runs with the software tool of the present invention, a "Read before Write" error at lines 14 and 15 will be reported because the first time through the argument loop the variable string_so_far has not been set to anything.

```
 1: /* file: heilo2.c */
 2: #include <stdlib.h>
 3:
 4: int main(int argc, char *argv[])
 5: {
 6:     char *string, *string_so_far;
 7:     int i, length = 1; /* Include trailing NUL */
 8:
 9:     for (i=0; i<argc; ++i) {
10:         length += 1 + strlen(argv[i]);
11:         string = malloc(length);
12:
13:         /* Copy the string built so far. */
14:         if (string_so_far != (char *)0) {
15:             strcpy(string, string_so_far);
16:         }
17:         else *string = '\0';
18:
19:         strcat(string, argv[i]);
20:         if (i < (argc-1)) strcat(string, "");
21:         string_so_far = string;
22: }
23: printf("You entered: %\n", string);
24: return 0;
25: }
```

The error diagnostics are:
Read before Write: 4 bytes at 0xbfffcb0; 4 bad bytes, first at 0xbfffcb0
from 0x0058+main line 14
from 0x00eb+_libc_start_main line 78
from 0x0021+.entry
from 0x3988+sigprocmask line 61
  0xbfffcb0 not within 100 bytes of any allocated block
Read before Write: 4 bytes at 0xbfffcb0; 4 bad bytes, first at 0xbfffcb0
from 0x005e+main line 15
from 0x00eb+_libc_start_main line 78
from 0x0021+.entry
from 0x3988+sigprocmask line 61
  0xbfffcb0 not within 100 bytes of any allocated block In one embodiment, the tool is capable of detecting memory leaks. A memory leak occurs when a piece of dynamically allocated memory can no longer be freed because the program no longer contains any pointers to that block. Thus, a memory leak is a block that has been allocated and has not been freed. This memory block cannot be reached by following a chain of pointers starting from the stack or statically allocated regions and going through other reachable allocated blocks. This is similar to the definition of "garbage" in classic garbage collection. Memory leaks are detected when the application calls exit ( ).

A block that has been allocated, but has not been freed, is memory that is "in use," and is reported only if requested by the command line parameter in-use-at-exit=1. It can be an interesting and productive exercise to try to write the application so that all allocated blocks are "recycled" by freeing them before exit ( ). This is one general approach to fixing memory leaks. A simple example of this behavior can be seen by running the (corrected) "hello2" program with the arguments:

tool ./hello2 this is a test

If the state of the program just prior to execution of line 21 (above program), is examined, it will be found that the variable string_so_far points to the string "hello", which it was assigned as a result of the previous loop iteration. The variable string points to the extended string "hello this", which was assigned on this loop iteration.

When line 21 is executed, "string_so_far=string;" will make both variables point to the longer memory block. Once this has happened, however, there is no remaining pointer that points to the shorter block. There is now no way that the memory that was previously pointed to by string_so_far can be reclaimed because it is permanently allocated. This is a "memory leak," which the tool finds and reports as shown below.

bytes leaked at 0x08049728 allocated 3 calls ago (serial 14)
from 0x005e+main line 11 f r o m 0 x 0 0 e b +_libc_start_main line 78 from 0x0021+.entryfrom 0x3988+sigprocmask line 61
16 bytes leaked at 0x08049778
allocated 2 calls ago (serial 15)
from 0x005e+main line 11
from 0x00eb+_libc_start_main line 78
from 0x0021+.entry
from 0x3988+sigprocmask line 61
22 bytes leaked at 0x080497d0
allocated 1 calls ago (serial 16)
from 0x005e+main line 11
from 0x00eb+_libc_start_main line 78
from 0x0021+.entry
from 0x3988+sigprocmask line 61

Errors often occur using dynamically allocated memory. In many cases, programs continue running after a programming error causes serious memory corruption—sometimes they don't crash at all. One common mistake that some programmers make is to try to reuse a pointer after it has already been freed. This "dangling pointer" problem often goes unnoticed, because many machines and compilers allow this particular behavior. The tool detects many dynamic memory bugs in addition to dangling pointers, including freeing the same memory block multiple times, freeing stack memory (local variables), passing a pointer that doesn't point to the start of a memory block to a delete operator or a free routine, calls to delete or free with NULL or uninitialized pointers, and passing nonsensical arguments to malloc, calloc, realloc or free.

Preferably, the tool has a programming interface which allows customization and control of error detection and reporting, particularly including the monitoring of calls to the operating system kernel. One example of customization is to report only the first Read before Write which occurs for a particular value of the program counter. This can be useful when running an existing application for the first time with the tool, to give an overview of behavior that deserves investigation. The file syscalls.c contains conditional compilation symbols ONLY_FIRST_BAD_READ_PER_LOCATION and N_1stONLY which can be used to implement such an overview customization.

Figure 3:
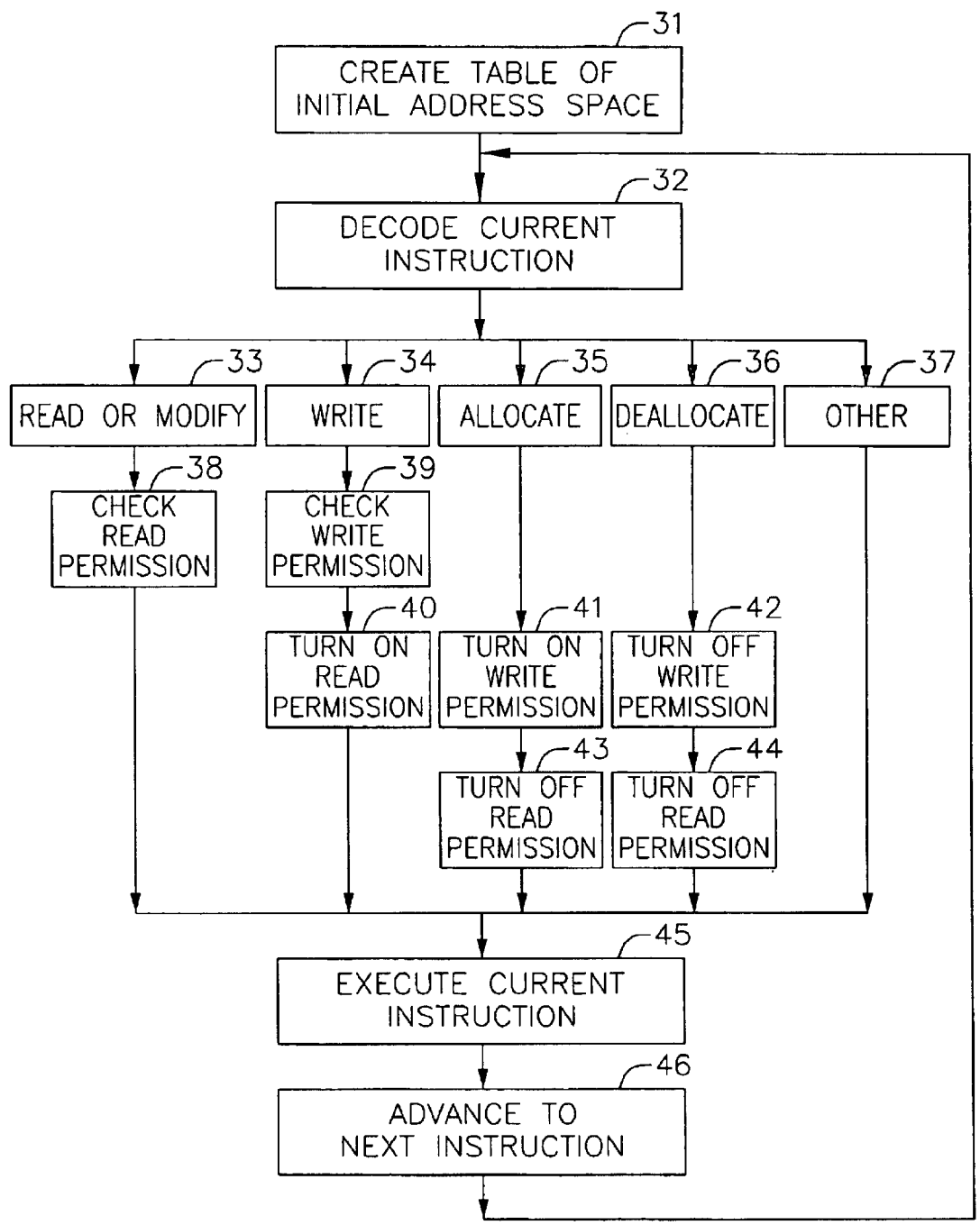
FIG. 3 is an exemplary flow chart of operation of one embodiment of the software tool of the present invention.

FIG. 3 is a flow chart of one exemplary operation of the software tool of the present invention. As shown, in block 31 (Create Table of Initial Address Space) a table of access permissions is constructed according to the operating system and conventions for initial layout of the address space of a new process. Blocks 32 through 46 indicate the flow during the processing of instructions. The general outline of such an interpreter is given in Donald E. Knuth, *The Art of Computer Programming*, volume 1/Fundamental Algorithms, Addison-Wesley 1968, second printing 1969, section 1.4.3 Interpretive routines, pp.197–210, section 1.4.3.2 Trace Routines, the entire contents of which are hereby incorporated by reference. A special case of a simulator, called a trace or monitor routine, is occasionally used to help in debugging, since it prints out a step-by-step account of how the simulated program behaves.

The present invention uses the step-by-step information to consult and update a table of memory states for each address in the memory address space. In one embodiment, the accounting table contains two bits for each byte of address space. The two bits encode four states:

00: byte is allocated and has been written; Reading is OK, Writing is OK.
01: byte is allocated but not yet written; Reading is bad, Writing is OK.
11: byte has "never" been allocated; Reading is bad, Writing is bad.
10: byte was allocated but also freed; Reading is bad, Writing is bad.

The states also encode which actions are legal. For example, writing a byte is bad if and only if the left bit is a 1, and writing a byte is OK if and only if the left bit is a 0. Similarly, reading a byte is bad if an only if either bit is a 1, and reading a byte is OK if and only if both accounting bits are 0. The accounting bits are preferably stored packed in memory, so that one eight-bit byte of accounting bits corresponds to four consecutive bytes of address space. The whole accounting table is stored piecewise linear by address, with an index to the pieces based on high-order bits of the memory address. Pieces which are entirely vacant are marked in the index (and are not otherwise present), and act as if all the bits are 11.

The accounting table is organized and encoded to be small and to provide fast and efficient answers to the questions "Is it bad to Read this memory location?" and "Is it bad to write to this memory location?" As long as the answer is "No," the tool proceeds to the next memory location. If the answer is "YES," the tool then notifies the user.

In block 32 (Decode Current Instruction) it is determined which class (es) of blocks 33 through 37 apply. Also, the address and length of the memory regions accessed are determined in this block. For instructions which affect memory, blocks 38 through 44 consult the table of memory state, and perform the appropriate accounting based on access type. Not shown are some special instructions which perform combinations of accesses. In particular, "PUSH register" is an allocate and then a write, and "POP register" is a read then a deallocate operation.

In block 45, the current instruction is executed as per Knuth (referenced above), and in block 46 the control advances to the next instruction, paying particular attention to JUMP and other transfers of control.

For most instructions, the memory addresses and lengths that are accessed can be determined just before the instruction is executed, by decoding the instruction and examining the values in the machine registers. For privileged instructions, such as system calls, the general schema of memory accesses is known in advance, but the numerical values might not be known until after the instruction executes. For example, a system call to read variable-length input from a tele-typewriter specifies the address and maximum length of a buffer to receive the data, but the actual size of the data that is read from the device is returned as an output value from the system call instruction.

Figure 4:
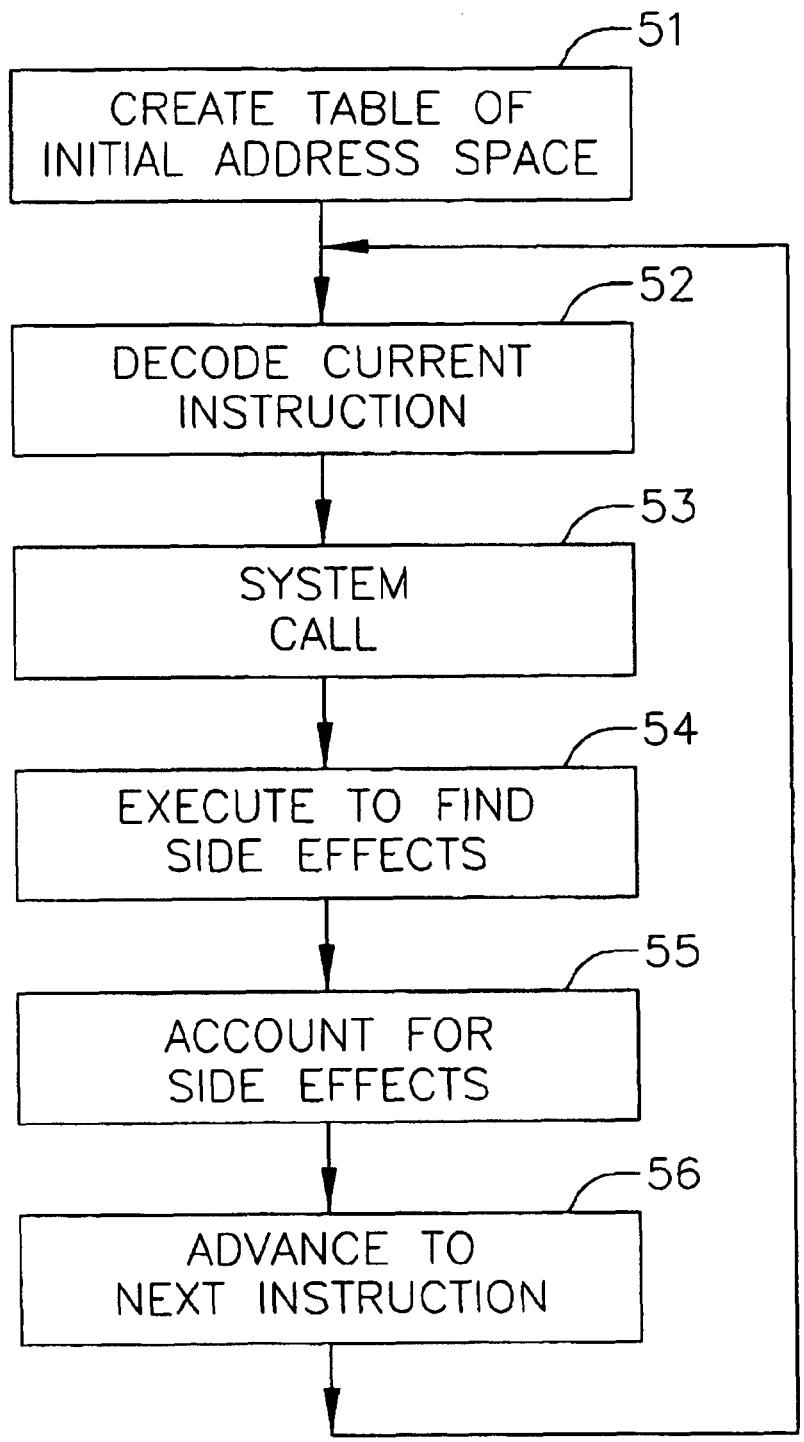
FIG. 4 is an exemplary flow chart of operation of one embodiment of the software tool of the present invention.

FIG. 4 is a flow chart of one exemplary operation of the software tool of the present invention. Similar to block 31 of FIG. 3, in block 51 a table of access permissions is constructed according to a given operating system. In block 52, similar to block 32, the address and length of the memory regions accessed are determined. Blocks 53 to 55 corresponds to identifying and separating a system call, from the Read, Modify, Write, Allocate, Deallocate, and other functions. As shown, a system call is performed in block 53. In order to maintain correct accounting, the system call needs to be executed first, as shown in block 54. The actual numerical values are obtained for the schema parameters of the system call, and then the accounting information is updated, as shown in block 55. Because the system call has already been executed, execute current instruction step of FIG. 3 (block 45 in FIG. 3) is skipped before entering block 56 and proceeding to next instruction.

Appendix I describes an annotated sample session using one embodiment of the software tool of the present invention referred to as "Chaperon." The session is annotated with comments, using lines that begin with the symbol '#', and using a font with characters of varying width. Literal text, either input or output, appears in a font with characters of fixed width. The session uses an optional software debugger 'gdb' to control the hardware, emulator, and program under test. Until the line "0x1700 in gdb_setup ( )" (approximately three quarters of the way down page App.I-1), the session details the setup, initialization, and preparation for useful error reports. The remainder of page App.I-1 illustrates some aspects of how the tool's embodiment of the emulator cooperates with the optional software debugger. At the middle of page App.I-2, the tool has detected a "Read before Write" error. The program under test reads the byte at address 0x0807c590 before that byte was written. The first trace-back identifies the active subroutines at the time of the bad memory access. The error report also identifies that the byte at 0x0807c590 is the last byte of a block of 417 bytes beginning at address 0x0807c3f0. This block was the block most recently allocated, and the trace-back at allocation also appears in the error report. The bottom of page App.I-2 and top of page App.I-3 show the interaction of the tool with an optional software debugger. The tool user (programmer) can find out more by looking at variables, parameters, and a more-complete trace-back. The middle of page App.I-3 shows that the program under test completed successfully despite the error, and that there were no memory leaks during this run.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for analyzing a computer program stored in a memory, the computer program including a plurality of computer executable instructions for execution on a target hardware platform, the method comprising:

emulating the target hardware platform in computer software that is stored in address ranges of the memory not used by the computer program;

fetching from the memory an executable instruction included in the computer program;

decoding the fetched instruction;

executing the decoded instruction on the emulated hardware platform; and monitoring data manipulation of the executed instruction on the emulated target hardware platform.

2. The method of claim 1, further comprising the step of detecting improper behavior by the computer program.

3. The method of claim 2, further comprising the step of reporting the improper behavior.

4. The method of claim 3, wherein the step of reporting includes identifying a type of improper behavior and where in the computer program the improper behavior occurred.

5. The method of claim 2, wherein the step of detecting improper behavior includes detecting access to a logically unallocated memory location.

6. The method of claim 2, wherein the step of detecting improper behavior includes detecting read access to bytes which have been allocated but not yet written.

7. The method of claim 2, wherein the step of detecting improper behavior includes detecting modify access to bytes which have been allocated but not yet written.

8. The method of claim 2, wherein the step of detecting improper behavior includes detecting a read operation that fetches uninitialized bytes from memory with logically undefined resulting value.

9. The method of claim 2, wherein the step of detecting improper behavior includes detecting errors of a dynamic memory allocation protocol.

10. The method of claim 2, wherein the step of detecting improper behavior includes detecting memory blocks that have been allocated and not freed.

11. The method of claim 2, wherein the step of detecting improper behavior includes detecting uninitialized memory locations.

12. The method of claim 2, wherein the step of detecting improper behavior includes detecting memory leaks.

13. The method of claim 2, wherein the step of detecting improper behavior includes detecting I/O errors.

14. The method of claim 2, wherein the step of detecting improper behavior includes detecting pointer errors.

15. The method of claim 1, further comprising the step of performing accounting of memory states and accesses.

16. The method of claim 1, further comprising the step of interfacing to a debugger to facilitate interaction with a user.

17. The method of claim 1, further comprising the step of creating a table of initial address space according to a pre-determined operating system.

18. A system for analyzing a computer program including a plurality of computer executable instructions for execution on a target hardware platform comprising:

a memory for storing the computer program and the target hardware platform;

means for emulating the target hardware platform in computer software that is stored in address ranges of the memory not used by the computer program;

means for fetching from the memory an executable instruction included in the computer program;

means for decoding the fetched instruction;

means for executing the decoded instruction on the emulated hardware platform; and means for monitoring data manipulation of the executed instruction on the emulated hardware platform of the executed instruction.

19. The system of claim 18, further comprising means for detecting improper behavior by the computer program.

20. The system of claim 19, further comprising means for reporting the improper behavior.

21. The system of claim 19, wherein the improper behavior includes read access to bytes which have been allocated but not yet written.

22. The system of claim 19, wherein the behavior includes detecting uninitialized memory locations.

23. The system of claim 19, wherein the improper behavior includes memory leaks.

24. The system of claim 19, wherein the improper behavior includes I/O errors.

25. The system of claim 19, wherein the improper behavior includes pointer errors.

26. The system of claim 18, further comprising means for creating a table of initial address space according to a pre-determined operating system.

* * * * *